United States Patent [19]

Whatcott

[11] Patent Number: 5,360,476
[45] Date of Patent: Nov. 1, 1994

[54] HIGH IMPACT RESISTANT FOAM PROTECTANT

[76] Inventor: Burton K. Whatcott, P.O. Box 863, Dolores, Colo. 81323

[21] Appl. No.: 100,769

[22] Filed: Aug. 2, 1993

[51] Int. Cl.$^5$ ............................................. C04B 14/00
[52] U.S. Cl. .................................... 106/719; 106/711; 106/721; 106/724; 106/737; 106/803; 106/811; 106/812; 106/823; 524/650
[58] Field of Search ............... 106/711, 718, 719, 721, 106/724, 737, 802, 803, 811, 817, 819, 823, 812; 524/650

[56] References Cited

U.S. PATENT DOCUMENTS

| | | | |
|---|---|---|---|
| 1,138,069 | 5/1915 | Applegate. | |
| 4,054,691 | 10/1977 | McMillan. | |
| 4,067,164 | 1/1978 | McMillan | 52/309 |
| 4,067,939 | 1/1978 | Lowe et al. | 106/723 |
| 4,240,952 | 12/1980 | Hulbert, Jr. et al. | 260/42.13 |
| 4,261,754 | 4/1981 | Krenchel et al. | 106/711 |
| 4,741,777 | 5/1988 | Williams et al. | 106/90 |
| 4,746,365 | 5/1988 | Babcock et al. | 106/802 |
| 4,767,461 | 8/1988 | Tamura et al. | 106/98 |
| 5,108,679 | 4/1992 | Rirsch et al. | 264/118 |

FOREIGN PATENT DOCUMENTS

| | | | |
|---|---|---|---|
| 2916335 | 8/1979 | Germany | 106/709 |
| 336307 | 4/1972 | U.S.S.R. | 106/737 |
| 621652 | 8/1978 | U.S.S.R. | 106/737 |
| 1057461 | 11/1983 | U.S.S.R. | 106/709 |

OTHER PUBLICATIONS

Kosmatka et al., "Design & Control of Concrete Admixtures", Thirteenth Edition, Portland Cement Asso., 1988 p. 66.

*Primary Examiner*—Anthony Green
*Assistant Examiner*—Michael Marcheschi

[57] ABSTRACT

A thin protective coating for foam surfaced objects achieving high compression and impact strengths without the need of water curing.

4 Claims, No Drawings

HIGH IMPACT RESISTANT FOAM PROTECTANT

BACKGROUND OF THE INVENTION

This invention relates to a foam protectant and more particularly to a fiber reinforced, polymer modified cementitious coating that is hand or spray applied to decorative foam shapes including furniture of various shapes.

For hundreds of years, very few changes have taken place in the formulation and application techniques of stucco-like material. Traditionally, stucco coating over frame construction is applied ⅞" thick in two separate coats. In order to achieve strength in this system, each coat must be laboriously water cured. In order to achieve good workability in conventional stucco, normal stucco mixes are designed with a high water demand which decreases the tensile and flexural strength of the mortar resulting in shrinkage, cracking during the drying process, and structural cracking due to its inability to withstand structural movement of the building it is applied on. Due to the high suction of conventional cementitious stucco mortar, thinly applied finish coats dry up quickly making it difficult to achieve consistently uniform finishes. The high suction also makes the stucco mortar susceptible to water penetration and staining.

DESCRIPTION OF THE PRIOR ART

U.S. Pat. No. 1,138,069 discloses a stucco like siding for building purposes comprising a substitute for the usual stucco finishes. The siding comprises a series of composite sheets each composed of a base of waterproof fabric, a pitchy waterproof coating thereon and a granular coating applied to the pitchy coating.

U.S. Pat. No. 4,054,691 discloses a process for promoting the adhesion of cementitious material to closed cell generally smooth skinned foam material.

U.S. Pat. No. 4,067,164 discloses composite panels for building purposes.

None of the known prior art disclose the improved lightweight foam protectant, self curing shrinkage controlled cementitious coatings set forth herein for covering decorative shapes including foam objects.

SUMMARY OF THE INVENTION

In accordance with the invention claimed, a fiber reinforced, polymer modified cementitious coating is disclosed which may be applied in a single application or coat from ⅛ to ¼ inches in thickness. This foam protectant bonds tenaciously to all types of foam and achieves high compressive and impact strengths. No water curing is required for this cementitious coating to achieve high compressive impact strengths that are many times greater than that of conventional mortar materials. This improved cementitious coating for foam surfaces has a tough elasticity that resists cracking even when applied ¼ inch thick. It is highly water resistant and its low suction allows finishes to be applied easier resulting in consistently uniform finishes. This formulation has a very low water/cement ratio with excellent workability.

It is, therefore, one object of this invention to provide a new and improved cementitious material for coating foam decorative objects including furniture.

Another object of this invention is to provide an improved cementitious material which will adhere reliably to the surface of a foam or foam object.

A further object of this invention is to provide improved moisture resistant cementitious coatings that employ polymers to insure flexibility and thereby eliminate or greatly reduce cracking of the cementitious material with time.

Further objects and advantages of the invention will become apparent as the following description proceeds and the features of novelty which characterize this invention will be pointed out with particularity in the claims annexed to and forming a part of this specification.

DESCRIPTION OF THE PREFERRED EMBODIMENT

The disclosed invention relates to a cementitious coating mortars for covering foam covered objects. The improved coating disclosed exhibits greatly enhanced bond, flexural, tensile and compressive strength as well as much greater resistance to abrasion. cracking and moisture than conventional mortars.

Compared to conventional ¾ inch thick mortars requiring two application base coats, the improved cementitious material disclosed herein may be applied in a single application ¼ inch thick. The improved cementitious material bonds tenaciously to the foam covered substrate it is applied to and requires no water curing to reach its high strength, unlike conventional mortars that depend wholly on laborious water curing to develop its strength. The low suction of the improved cementitious coating makes finishes easier to apply and uniform in texture and color.

The following describes the ingredients set forth below and the approximate weights in which, they may be effectively used.

Cement—Any type of Portland cement.

Silica Fume—Ranging from 1% to 100% by weight of cement.

Polymer—Can be any type of latex or powder from polymer or copolymer including acrylic, styrene acrylic, styrene butadiene, P.V.A., etc. or combination of two or more polymers or copolymers ranging from 1% to 25% solids by weight of total and silica fume.

Reinforcing Fibers—Any type of natural or synthetic fiber ranging from 1/32" to ½" in length, amount of fiber can range from 1% to 20% by weight of total cement and silica fume.

Aggregate/Filler—Any type or blend of filler/aggregate ranging from #300 mesh to #4 mesh, in amounts ranging from 1/2:1 to 5:1 by volume of cement and silica fume.

Plasticizer—Any type including acrylate, urethane cellulosic, poly vinyl alcohols, clay. etc. ranging from 1% to 50% by weight of cement and silica fume.

Dispersant—Any type ranging from 0.05% to 5%. by weight of total mix.

Water Reducer—Any type ranging from 0.25% to 10% by weight of cement and silica fume.

Defoamer—Any type of wet or dry defoamer or anti-foam ranging from 0.25% to 20% by weight of polymer solids.

The invention is best illustrated by the following example. Throughout the following example and the specification, unless specifically provided otherwise, parts of the disclosed cementitious material are given as approximate parts and/or percentages by weight.

| | | |
|---|---|---|
| 90.00 lbs. | Cement | Type I or II |
| 10.00 lbs. | Silica Fume | |
| 4.00 lbs. | Plasticizer | Bentonite Clay |
| 11.00 lbs. | Polymer Solids | Styrene Butadiene Rubber |
| 2.00 lbs. | Reinforcing Fibers | Monofilament |
| 125.00 lbs. | Filler/Aggregate | |
| .58 lbs. | Dispersant | Tamol 819 |
| 1.20 lbs. | Defoamer | 778-DD |
| .50 lbs. | Water Reducer | Sodium Citrate |
| | Water | As Needed |

Remarks:
1. Accelerators or retarders may be added to adjust set time;
2. Hydrated lime or other plasticizers may be used in a range up to 50% by weight of cement and silica fume in place of the clay plasticizer; and
3. Colorants may be added, if desired.

The key to this invention is the utilization of polymers and reinforcing fibers in the mixture together with greatly reduced water to cement ratios that eliminate the high shrinkage found in conventional mortars. The fiber reinforced polymer modified cementitious coating may be hand or spray applied to furniture and decorative foam shapes in a single coat application from ⅛ to ¼ inch in thickness. This foam protectant bonds tenaciously to all types of foam achieves high compression and impact strengths without water curing.

Although but one embodiment has been and described, it will be apparent to these skilled in the art that various changes and modifications may be made therein without departing from the spirit of the invention or from the scope of the appended claims.

What is claimed is:

1. A high impact resistance foam protectant consisting of in parts by weight:
   about 90 parts of cement,
   about 4 parts of a plasticizer,
   about 11 parts of polymer solids,
   about 2 parts of reinforcing fibers,
   about 125 parts of filler aggregate,
   about 0.58 parts of a dispersant,
   about 1.20 parts of a defoamer,
   about 0.50 parts of a water reducer, and
   water as needed to provide a pliable product.

2. A high impact resistant foam protectant consisting of in parts by weight;
   about 90 parts of cement,
   about 10 parts of silica fume,
   about 4 parts of bentonite clay,
   about 11 parts styrene butadiene rubber solids,
   about 2 parts of a synthetic fiber,
   about 125 parts of filler aggregate,
   about 0.58 parts of a dispersant,
   about 1.20 parts of a defoamer,
   about 0.50 parts of sodium citrate, and
   water as needed to provide a plurality product.
   about 0.50 parts of sodium citrate, and 3. The high impact resistant foam protectant set forth in claim 2 wherein:
   the water added forms a sprayable product.

4. A high impact resistant foam protectant consisting of in parts by weight:
   about 90 parts of cement,
   from about 1% to 100% of the weight of the cement of silica fume,
   from about 1% to 50% of the weight of the fume and the cement of a plasticizer,
   from about 1% to 25% of the weight of the fume and the cement of polymer solids,
   from about 1% to 20% of the weight of the fume and the cement of reinforcing fibers,
   from about 50% to 500% of the volume of the cement and silica fume of a filler aggregate,
   from about 0.05% to 5% by weight of the total mix of a dispersant,
   from about 0.25% to 20% by weight of the polymer solids of a defoamer,
   from about 0.25% to 10% by weight of the cement and silica fume of a water reducer, and
   water as needed to provide a pliable product.

* * * * *

UNITED STATES PATENT AND TRADEMARK OFFICE
CERTIFICATE OF CORRECTION

PATENT NO. : 5,360,476
DATED : Nov. 1, 1994
INVENTOR(S) : Burton K. Whatcott

It is certified that error appears in the above-identified patent and that said Letters Patent is hereby corrected as shown below:

Column 3:
Claim 1, line 1, cancel "resistance" and substitute ---resistant---.

Column 4:
Claim 2, line 12, cancel "plurality" and substitute ---pliable---.

Claim 2, cancel line 13.

Signed and Sealed this

Tenth Day of January, 1995

Attest:

BRUCE LEHMAN

Attesting Officer

Commissioner of Patents and Trademarks